United States Patent [19]

Van Natta et al.

[11] Patent Number: 4,796,550
[45] Date of Patent: Jan. 10, 1989

[54] SINGLE ANGLED BLADE COULTER AND FERTILIZER OPENER

[75] Inventors: Terry L. Van Natta, Bettendorf, Iowa; Donald R. Hartwig, Rock Island, Ill.

[73] Assignee: Deere & Co., Moline, Ill.

[21] Appl. No.: 717,394

[22] Filed: Mar. 29, 1985

[51] Int. Cl.$^4$ .................. A01C 5/08; A01B 39/08; A01B 63/16
[52] U.S. Cl. .................................. 111/87; 111/73; 111/7; 172/572; 172/536; 172/539
[58] Field of Search ............ 111/1, 52, 6, 7, 62, 111/70, 71, 79, 73, 80, 81, 83–87; 172/572, 573, 29, 574, 603, 166, 570, 705, 536, 574, 578, 519, 764, 736, 738, 739, 740, 539; 403/389, 399, 396, 387, 398, 390

[56] References Cited

U.S. PATENT DOCUMENTS

| | | | |
|---|---|---|---|
| 680,061 | 8/1901 | Moehring | 111/87 |
| 1,192,996 | 8/1916 | Dennis | 403/398 |
| 1,242,591 | 10/1917 | Raulz | 111/85 X |
| 1,330,451 | 2/1920 | Salmon | 111/87 |
| 2,230,331 | 2/1941 | Mobley | 111/80 X |
| 2,611,331 | 9/1952 | O'Neil | |
| 2,998,853 | 9/1961 | Martensen | 172/383 |
| 3,055,322 | 9/1962 | Oehler et al. | 111/80 X |
| 3,258,076 | 6/1966 | Groenke | 172/705 |
| 3,632,043 | 1/1972 | Kirschmann | 111/6 X |
| 3,673,970 | 7/1972 | Hatcher | 111/86 X |
| 3,701,327 | 10/1972 | Krumholz | 111/87 X |
| 3,760,089 | 1/1988 | Harter | 111/86 X |
| 4,055,126 | 10/1977 | Brown et al. | 111/85 |
| 4,227,581 | 10/1980 | Klotzbach | 172/166 X |
| 4,333,535 | 6/1982 | Hentrich | 172/572 |
| 4,407,371 | 10/1983 | Hohl | 172/166 X |
| 4,408,551 | 10/1983 | Keller et al. | 172/536 |
| 4,574,715 | 3/1986 | Dietrich et al. | 111/7 |

FOREIGN PATENT DOCUMENTS

| | | | |
|---|---|---|---|
| 282968 | 3/1915 | Fed. Rep. of Germany | 172/536 |
| 2577753 | 8/1986 | France | 47/9 |

Primary Examiner—Robert A. Hafer
Assistant Examiner—Danton D. DeMille
Attorney, Agent, or Firm—Henderson & Sturm

[57] ABSTRACT

A conservation tillage attachment for a seed planting unit that functions to cut and clear away prior crop residue, fracture the soil ahead of the seed trench opener, and form a trench for the deposit of dry or liquid fertilizer offset from and parallel to the later formed seed trench. The attachment includes a single disk blade disposed forward of the seed trench forming unit. The single disk blade is disposed at an angle of approximately 5° from the line defining the direction of travel of the seed planting implement. The attachment includes a selectively adjustable down force structure and a selectively adjustable depth control mechanism.

1 Claim, 4 Drawing Sheets

SINGLE ANGLED BLADE COULTER AND FERTILIZER OPENER

TECHNICAL FIELD

This invention relates to seed planting implements and more particularly to an attachment adapted for use in conjunction with a seed planting implement.

BACKGROUND ART

The trend toward conservation practices in agriculture has led to the utilization of no-till and conservation tillage attachments for use in conjunction with conventional seed planting implements. In a conservation tillage program, the formation of the seed trench and the placement of the seed in the seed trench follows after cutting and clearing away of the prior crop residue and fracturing of the soil ahead of the seed trench opener. Also, it is sometimes desirable to apply dry or liquid fertilizer ahead of and to one side of the seed trench.

Placing separate attachments in sequence ahead of the seed planting unit to accomplish the required steps of cutting the crop residue, clearing it away, fracturing the soil, and applying fertilizer has proven to be impractical. This sequential arrangement of tools requires long supporting frames that result in poor tool tracking and poor material placement when turning for contours or end rows.

Coulter blades are used as preopeners to fracture the soil in hard, rough ground, and double disk fertilizer openers are used to form a fertilizer trench and clear away crop residue. In some conditions, the coulter blades and double disk openers push the crop residue or vegetation into the soil without cutting it, thus providing a poor seedbed. Also, to function and penetrate properly in hard soils, double disk fertilizer openers require higher forces and strength of structure than is practical to build.

Those concerned with these and other problems recognize the need for an improved conservation tillage attachment for a seed planting implement.

DISCLOSURE OF THE INVENTION

The present invention provides a conservation tillage attachment for a seed planting unit that functions to cut and clear away prior crop residue, fracture the soil ahead of the seed trench opener, and form a trench for the deposit of dry or liquid fertilizer offset from and parallel to the later formed seed trench. The attachment includes a single disk blade disposed forward of the seed trench forming unit. The single disk blade is disposed at an angle of approximately 5° from the line defining the direction of travel of the seed planting implement. The attachment includes a selectively adjustable down force structure and a selectively adjustable depth control mechanism.

The single disk blade has the high down forces of a conventional coulter to cut residue and penetrate hard soils. The angled disk blade cuts trash better than a conventional coulter, however, since the angle provides a side scraping action that aids in cutting. Since the disk blade is disposed at an angle with respect to the direction of travel, the point directly below the center of the circular disk blade will be the point of deepest penetration of the disk blade into the soil. The portion of the disk blade forward of its center compresses and fractures the soil directly in front of the seed trench opener, while the portion of the disk blade directly below its center forms a slot or trench for fertilizer which is offset from and parallel to the seed trench.

An object of the present invention is the provision of an improved conservation tillage attachment for a seed planting implement.

Another object is to provide a single attachment for a seed planting implement that simultaneously cuts and clears away crop residue, fractures hard soil, and forms a fertilizer trench forward of the seed planting unit.

A further object of the invention is the provision of an attachment for a seed planting unit that is easily installed and maintained.

Still another object is to provide an attachment for a seed planting unit including a selectively adjustable downforce structure independent of the individual planting units.

A still further object of the present invention is the provision of an attachment for a seed planting unit including a selectively adjustable depth control independent of the individual planting units.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
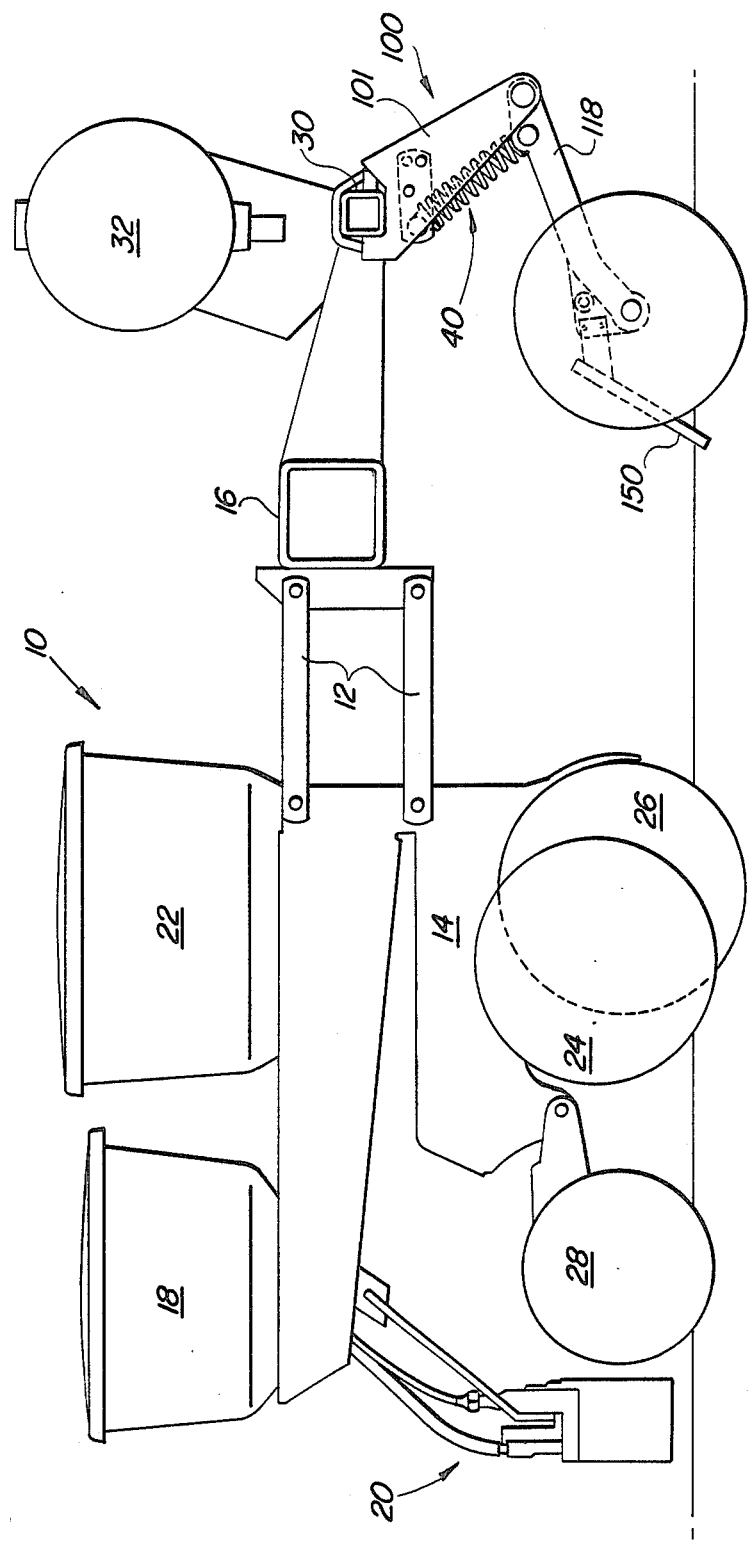
FIG. 1 is a side elevational view of the conservation tillage attachment mounted on the main frame of a planting implement forwardly of and independently from the individual planting units.

Referring now to the drawings, wherein like reference numerals designate identical or corresponding parts throughout the several views, FIG. 1 shows a planting unit (10) mounted by parallel linkage bars (12) which interconnect the subframe (14) of the planting unit (10) to a main frame (16). The parallel linkage bars (12) provide for independent vertical movement of the planting unit (10) with respect to other planting units carried by the main frame (16). The upper portion of the subframe (14) supports a granular chemical hopper (18) including a chemical distributor (20), and a seed hopper (22). The subframe (14) is supported by a pair of adjustable gauge wheels (24) which control the depth of the seed trench forming disks (26). A pair of closing wheels (28) are supported by the subframe (14) rearwardly of the gauge wheels (18). The closing wheels (28) exert a downwardly and inwardly directed force adjacent the formed furrow sufficient to collapse the formed furrow wall to provide a uniform soil cover for the deposited seeds. A short frame (30) extends forward of the main frame (16) and supports a liquid fertilizer tank (32).

Figure 2:
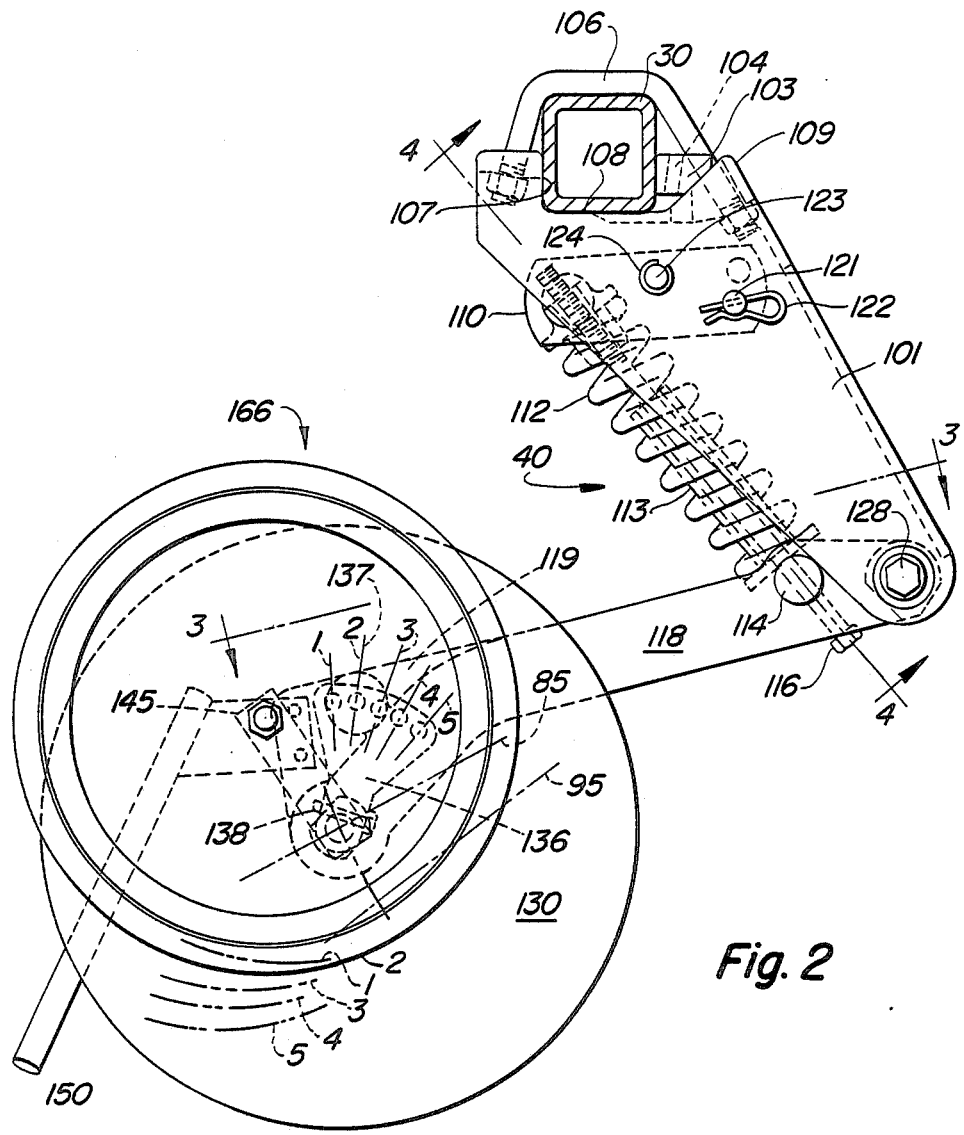
FIG. 2 is an enlarged elevational view illustrating the adjustable down force structure and adjustable depth control of the single angled disk blade.

The conservation tillage attachment generally designated by the reference numeral (100) is supported by the short frame (30) and depends downwardly therefrom. As best shown in FIG. 2, the attachment (100) includes a substantially vertical support (101) which interconnects the short frame (30) and a substantially horizontal support arm (118). The support arm (118), in turn, carries a single disk blade (130) and an adjustable depth gauge wheel assembly (166).

The upper portion of the vertical support (101) includes a frame engaging section having a vertical face (107), a horizontal ledge (108), and an inclined lip (109). A wedge plate (103) attached by bolts (104) and U-bolt (106), tightly attaches the support (101) to the short frame (30). The wedge plate (103) includes a first surface in contact with the inclined lip (109) and a second surface in contacting relationship with the short frame (30). The U-bolt (106) pulls the horizontal ledge (108) tightly against the lower horizontal section of frame (30) while the cooperation of the inclined lip (109) with the wedge plate (103) pulls the vertical face (107) and the vertical portion of the wedge plate (103) tightly against the vertical sections of the frame (30). This firm mounting resists movement of the support (101) under high loads without the need to maintain close manufacturing tolerances.

Figure 4:
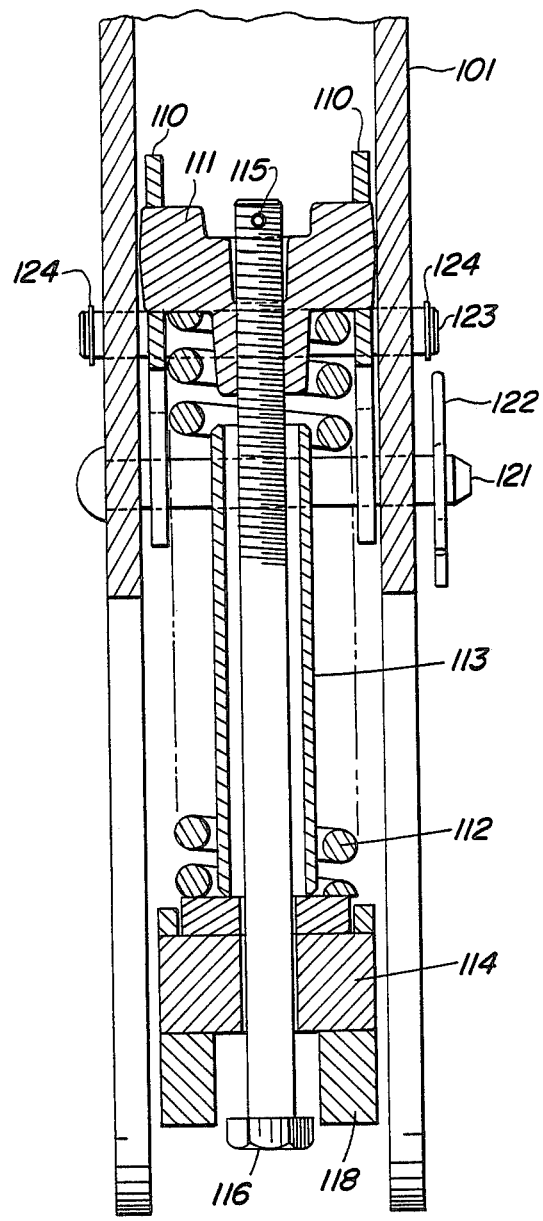
FIG. 4 is a partial fragmented elevational view taken along line 4—4 of FIG. 2 illustrating the details of the adjustable down force structure.

Referring now to FIGS. 2 and 4, the selectively adjustable down force structure (40) is shown interconnecting the vertical support (101) and the arm (118). The down force structure (40) includes an opposing pair of force adjustment straps (110) pivotally attached near their midpoints by a groove pin (123) and snap rings (124) to the vertical support (101). One end of the straps (110) includes an opening to receive a spring trunnion (111) and the opposite end of the straps (110) includes a plurality of openings registerable with openings in the support (101). The adjustment straps (110) are secured in a plurality of selected positions by inserting a drilled pin (121) through the registered openings and holding the pin (121) in place with a pin retainer (122).

A compression spring (112) is carried on a spring spacer (113) and a spring pin (114), and held in position by engagement of a spring preload bolt (116). The spring pin (114) pivotally connects the lower portion of the down force structure (40) to the horizontal support arm (118). The upper portion of the down force structure (40) is pivotally and adjustably attached to the vertical support (101) by drilled pin (121) and grooved pin (123).

The vertical support (101) and the horizontal support arm (118) are pivotally attached by a flange bolt (128). This pivotal attachment includes a hollow pin (not shown) with the end outside diameters tapered and split bushings (not shown) with matching tapers. When the flange bolt (128) is tightened through the bushings and the hollow pin, it causes the bushings to expand as they slide on the hollow pin. The bushings and pin become tight in the support (101) and minimize the looseness of the arm (118) thus maintaining more accurate positioning of the angled disk blade (130) under side loading.

Figure 3:
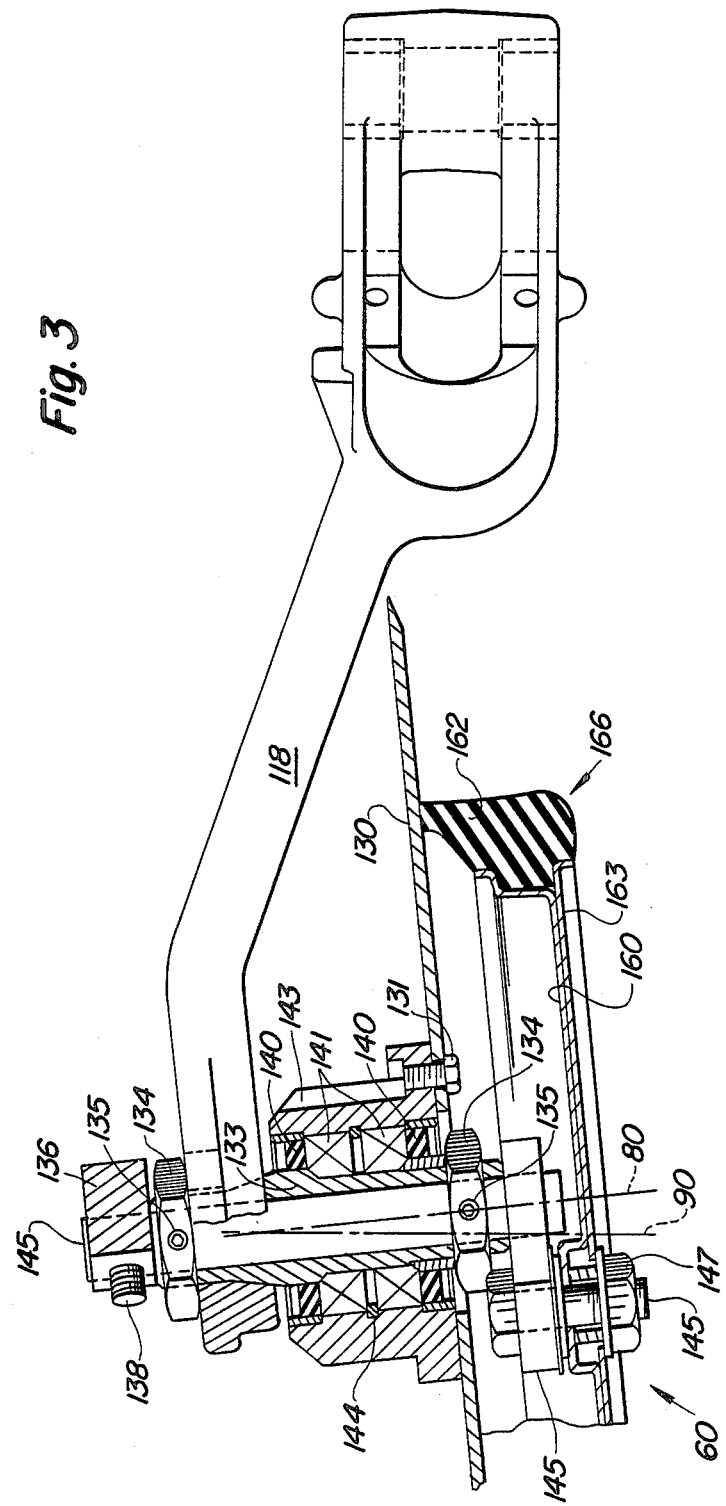
FIG. 3 is a partial fragmented plan view taken along line 3—3 of FIG. 2 illustrating the angled orientation of the disk blade and the attachment of the disk blade and the gauge wheel to the support arm.

Referring now to FIGS. 2 and 3, the single angle disk blade (130) is rotatably mounted to the rearwardly and downwardly depending end of arm (118).

The tapered end of a hollow spindle (133) is received through an opening on the arm (118) and is secured thereto by first nut (134) and first set screw (135). The disk blade (130) is attached to a bearing housing (143) by bolts (131). The bearing housing (143) rotates with respect to the spindle (133), and the bearing housing (143) is secured in its horizontal position with respect to the spindle (133) by a second nut (134) and a second set screw (135). A hollow spindle (133) is received through an opening on the arm (118) and is secured thereto by nut (134) and set screw (135). The disk blade (130) is attached to a bearing housing (143) by bolts (131) and the bearing housing (143) is secured to the spindle by nut (134) and set screw (135). The bearing housing (143) encloses and protects a pair of seals (140) and bearings (141) held in position by a snap ring (144). As seen by reference to FIG. 3, the hollow spindle (133) has an axis (80) that is disposed at a 5°–7° angle with respect to a transverse reference line (90). Since the disk blade (130) is disposed perpendicular to the spindle (133), it will be disposed at a 5°–7° angle with respect to the direction of travel of the planting unit (10).

The selectively adjustable depth control mechanism (60) is best shown in FIGS. 2 and 3. The gauge wheel assembly (166) includes a flexible tire (162) mounted on an inner and outer wheel (160) and (163). The gauge wheel assembly (166) is rotatably mounted on an arm assembly (145) and is adjustable with respect to the disk blade (130). The arm assembly (145) has a shaft portion that extends through the hollow spindle (133), an offset portion extending perpendicular to the shaft, and a gauge wheel spindle portion that extends out from the offset portion to rotatably receive the gauge wheel assembly (166) which is secured thereto by nut (147). The end of the shaft portion extending through the hollow spindle (133) receives a depth adjustment arm (136). The depth adjustment arm (136) is secured to the shaft of the arm assembly (145) by engagement of a tapered cotter pin (138) through an opening in the depth adjustment arm (136). The tapered pin (138) engages a notch in the shaft of the arm assembly (145), thus preventing both axial and rotational movement. The depth adjustment arm (136) includes a number of openings that are selectively registerable with an opening in a web (119) which extends from the body of arm (118). When an appropriate depth adjustment is selected, a bolt (137) is secured in the registered openings. The web (119) also includes openings to receive attachment bolts (152) for securement of either liquid or dry fertilizer feed tubes (150).

In operation, the conservation tillage attachment (100) is mounted ahead of the seed trench opener (26) on the subframe (14) of the seed planting unit (10), on the main frame (16), or on the short frame (30). Mounting independently from the seed planting unit (10) is preferred since it minimizes potential damage to the planting unit (10). The down force adjustment is set by the proper positioning of drilled pin (121) in the registered opening of the force adjustment straps (110). Referring to FIG. 2, reference line (85) represents a working condition where the spring (112) is compressed somewhat to provide down force and reference line (95) represents the extreme extended position as in a transport mode where the head of bolt (116) would abut the spring pin (114). The depth of penetration of the single angled disk blade (130) is selectively adjusted by positioning of bolt (137) through the appropriate registered openings in the web (119) and the depth adjustment arm (136). Reference numerals 1 through 5 in FIG. 2 illustrate five positions of the depth adjustment arm (136) and the corresponding five positions of the gauge wheel assembly (166).

When the down force and the depth of penetration of the single angled disk blade (130) are adjusted at the desired settings, the attachment (100) provides for the simultaneous cutting and clearing away of crop residue, fracturing the hard soil directly in front of the seed trench opener (26), and formation of a slot for the deposition of liquid or dry fertilizer. Improved cutting of crop residue provided by the scraping action of the angle disk blade (130) results in an improved seedbed, seed to soil contact, and better germination.

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

I claim:

1. In an attachment for a seed planting implement of the type including a main frame adapted to be moved along the ground and having at least one seed planting unit connected to said main frame, said seed planting unit including a subframe and a seed trench forming unit attached to the subframe, the improvement comprising:

a single disk blade disposed forward of the seed trench forming unit and mounted to the main frame independently of the subframe, said single disk blade being disposed on a support arm at an angle to the direction of travel of said implement;

means for selectively adjusting a downwardly biasing force on said disk blade wherein said adjustable force means includes a compression spring disposed to interconnect a support attached to said main frame and said single disk blade, and a pivotable force adjustment strap pivotally attached to said support and having one end attached to said spring and having the opposite end selectively securable to said support in a plurality of position; and means for selectively adjusting the working depth of said disk blade wherein said depth adjustment means includes a gauge wheel rotatably attached adjacent to said disk blade and having a center point selectively movable with respect to the center point of said disk blade, and wherein said single disk blade is rotatably mounted on a hollow spindle attached to the support arm and said gauge wheel is rotatably attached to an offset spindle of an arm assembly having a first shaft portion received and secured within said hollow spindle.

* * * * *